| United States Patent [19] | [11] Patent Number: 4,746,575 |
| Scarati et al. | [45] Date of Patent: May 24, 1988 |

[54] PROCESS FOR LUBRICATING ACCESSORIES OF CASSETTES CONTAINING MAGNETIC TAPES

[75] Inventors: Mario A. Scarati; Carlo Tognoni, both of Milan; Piero Giunti, Brescia; Luigi Salvioli, Brescia; Gian M. Sigismondi, Brescia, all of Italy

[73] Assignee: Ausimont S.p.A., Milan, Italy

[21] Appl. No.: 880,919

[22] Filed: Jul. 1, 1986

[30] Foreign Application Priority Data

Jul. 3, 1985 [IT] Italy .................. 21417 A/85

[51] Int. Cl.$^4$ .................. B32B 27/00; C10M 105/08
[52] U.S. Cl. .................. 428/421; 428/422; 360/132; 252/54; 568/601
[58] Field of Search .................. 427/131; 568/601; 360/132; 252/54; 428/421, 422

[56] References Cited

U.S. PATENT DOCUMENTS

| 3,665,041 | 5/1972 | Sianesi et al. ............ 568/601 |
| 4,188,434 | 2/1980 | Loran .................. 427/131 |
| 4,446,193 | 5/1984 | Aliafzali-Ardakami ............ 427/131 |
| 4,520,070 | 5/1985 | Yamamoto et al. .............. 428/336 |
| 4,526,833 | 8/1985 | Burguette et al. ............ 428/422 X |
| 4,529,658 | 7/1985 | Schwartz et al. ............ 428/422 X |
| 4,557,948 | 12/1985 | Yamamoto et al. ............ 427/131 |
| 4,570,197 | 2/1986 | Hakanson et al. ............ 427/128 X |
| 4,675,452 | 6/1987 | Lagow et al. ............ 252/54 |

*Primary Examiner*—Thurman K. Page
*Assistant Examiner*—L. R. Horne
*Attorney, Agent, or Firm*—Stevens, Davis, Miller & Mosher

[57] ABSTRACT

Process for protecting magnetic tapes, during their operation, from the friction and wear caused by the contact with accessories, either or not metallic, forming the cassette which contains said tapes, characterized in that said accessories are lubricated with a neutral perfluoropolyethereal fluid or with a perfluoropolyethereal fluid having functional groups at one or both ends of the polymeric chain.

5 Claims, No Drawings

PROCESS FOR LUBRICATING ACCESSORIES OF CASSETTES CONTAINING MAGNETIC TAPES

BACKGROUND OF THE INVENTION

1. Field of the Invention

The present invention relates to the use of fluids for lubricating accessory elements which magnetic tapes come in contact with, during their operation, in the devices containing them.

More in particular, this invention relates to the use of lubricants based on perfluoropolyethers in order to reduce the friction and/or wear phenomena which the magnetic tapes are subjected to owing to the contact with the accessory elements of the cassettes in which the magnetic tapes are contained.

Said friction problems arise in any device utilizing magnetic tapes, however, for the sake of simplicity, the audio or video cassettes will be discussed in particular.

It is understood, however, that the use of the perfluoropolyethers, which is the object of the present invention, can be extended to any device which includes magnetic tapes cassettes, such as, for example, magnetic tapes for computers or typewriters.

2. The Prior Art

As is known, the audio cassettes consist, for example, of an outer casing of plastic material, which consists of two flat valves, which fit into each other and are fixed by means of screws. Inside the valves there are two horizontally arranged reels, round which the magnetic means winds up.

The recording occurs on the tape portion having access to the outside, to which it comes through proper guides and through a window in the cassette edge.

While the device is in operation, the reels are not axially constrained, but are simply caused to rotate by the corresponding pins, so that the tape edge slides against the plastic casing and is subjected to considerable wear and friction phenomena.

During operation, furthermore, the tape comes into contact with other metallic or non-metallic accessory elements, which have the function of guiding the tape so that it can wind up around the respective reels.

To reduce the rubbing of the tape against the plastic casing of the cassette it is known to interpose, between the two parts of plastic material which form the cassette and the reels, two sliding sheets, which are called liners, are generally selflubricating and are obtained by means of punching from a plastic material sheet.

The plastic material generally utilized is based on polyesters, such as e.g. polyethyleneterephthalate.

The interposition of the liners, however, is accompanied by the drawback of leading to a bunching of electrostatic charges by triboelectric effect during the operation of the device, with consequent increase of friciton which results in a worsening of the recording qualities, or jamming of the tape and also, in some cases, breaking of tape.

To overcome these drawbacks it is known to coat the liners surface with a layer of a material containing dispersed graphite. This process consists in depositing on the liner, according to known techniques, a suspension of graphite particles in a suitable binder, generally vinyl resins dissolved in proper solvents. This method is known in the art as graphitized coating.

The graphitized coating is affected however by the drawback of being subjected to progressive wear and flaking during the tape operation due to friction. Furthermore, this method is very expensive as it requires highly sophisticated techniques to obtain very uniform graphite coatings on the liner.

A further complication exhibited by this method is represented by the obtainment of a good adhesion of the graphitized coating to the plastic substrate.

It is also known to utilize lubricants of the class of the polyalcohols; these fluids, however, do not possess good lubricating properties and have a low stability to chemical agents and to oxidation, what limits the performance constancy over rather long stretches of time.

Liners based on graphite-filled polytetrafluoroethylene (PTFE) are known as well. In this case, however, it should be taken into consideration that the liners based on PTFE are very difficult to prepare with the dimensional parameters required for the application in audio cassettes. In fact, PTFE is very difficult to produce in extremely thin films, and this strongly reduces the utilization thereof, as the use of layers of greater dimensions results in too high costs which are not compatible with these uses.

PTFE, though being abstractly a material suited to reduce the friction phenomena, is in practice not utilized because of the above-mentioned drawbacks.

In addition, the sliding on the accessories acting as a guide for the winding up of the tape around the reels during the magnetic tape operation is a further cause of wear and friction.

The sliding phenomenon on accessory elements of the cassette containing the magnetic tape is actually the only cause of friction and wear in the video cassettes, where no sliding sheets are used. In fact, the video cassettes consist of two valves in plastic material and are free of liners, as the magnetic tape is wound up on two reels equipped with flanges, and in order to permit the access to the tape from the outside, the tape is made to pass on two metal cylinders, generally made of stainless steel, and it is kept under tension by a proper tab of plastic material which presses the tape.

As one of the maincharacteristics of the coatings of the tapes' accessory parts is the constancy of their performances over a very long stretch of time, there was a great requirement to find a material capable of reducing to the least possible the friction and wear phenomena as well as the triboelectric effect described hereinbefore.

THE PRESENT INVENTION

It has now surprisingly been found that it is possible to overcome the cited drawbacks by utilizing, as a lubricating fluid, a fluid based on perfluoropolyethers applicated to the surface of the liners or of all the accessory elements of the divices necessary for the operation of the magnetic tapes contained in cassettes.

These lubricants offer the advantage of enormously reducing the interface friction and wear between tape and liner, or between liner and accessory elements, and furthermore they are not affected by the difficulty of obtaining uniform and extremely thin coatings, as in the case of the graphitized coatings; moreover, they are easy to applicate on the plastic liner or on the accessory elements of the cassettes.

In addition to the foregoing, the perfluoropolythereal compounds are endowed with a high stability to chemical agents and to oxidation, which imparts to the coating the capability of providing constant performances in the long run.

The perfluoropolyethers which can be advantageously used for the purposes of the invention are selected from the following classes of compounds comprising the constitutive units of the types listed hereinbelow:

(A1) ($C_3F_6O$) and (CFXO) statistically distributed along the perfluoropolyether chain, where X is —F, —$CF_3$;

(A2) ($C_3F_6O$);

(A3) ($C_3F_6O$), ($C_2F_4O$), (CFXO), statistically distributed along the perfluoropolyether chain, where X is —F, —$CF_3$;

(A4) ($C_2F_4O$), ($CF_2O$) statistically distributed along the perfluoropolyether chain;

(A5) ($C_3F_6O$), this class comprising furthermore the characteristic group —$CF(CF_3)$—$CF(CF_3)$—;

(A6) an oxetane ring of general formula selected from:

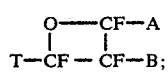 (1)

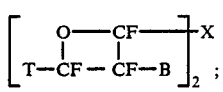 (2)

in which at least one of the groups linked to the ring contains an ethereal oxygen atom;

or an oxetane ring of general formula selected from:

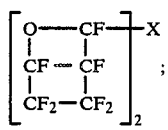 (3)

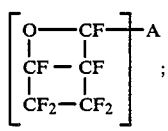 (4)

in which the group linked to the ring contains at least an ethereal oxygen atom;

(A7) ($CD_2CF_2CF_2O$), where D is H or F;

(A8) ($CF_2CF_2O$).

The utilized perfluoropolyethers, whichever of the above mentioned classes they may belong to, can have a very broad viscosity range, generally from 10 to 1500 cSt, in particular from 60 to 250 cSt (at 20° C.).

The perfluoropolyethers employable in the present invention are selected in particular from the ones belonging to the following perfluoropolyether classes:

(A1) $R_fO(C_3F_6O)_m(CFXO)_nR_f$ in which $R_f$=—$CF_3$, —$C_2F_5$, —$C_3F_7$, X is —F, —$CF_3$; m and n are integers, and the m/n ratio ranges from 5 to 40 when n is different from 0. These compunds are prepared according to the process described in GB Pat. No. 1,104,482 and by means of subsequent neutralization reaction, as is described below for class (A4);

(A2) $C_3F_7O(C_3F_6O)_m$—$R_f$ where $R_f$ may be —$C_2F_5$, —$C_3F_7$, —$CFHCF_3$ and m is a positive integer. These compounds are prepared according to U.S. Pat. No. 3,242,218;

(A3) $CF_3O(C_3F_6O)_m(C_2F_4O)_n(CFXO)_q$—$CF_3$ where X is equal to —F, —$CF_3$; m, n and q are integers, and n and q may also be O; the ratio m/n+q ranges from 0 to 50, n/q ranges from 0 to 10, n+q and q being respectively different from 0.

These products are obtained by photooxidation of mixtures of $C_3F_6$ and $C_2F_4$ and subsequent neutralization with fluorine according to the process described in U.S. Pat. No. 3,665,041;

(A4) $CF_3O(C_2F_4O)_p(CF_2O)_q$—$CF_3$ where p and q are integers like or different from each other and they may be also O, where the p/q ratio ranges from 0.5 to 1.5.

These perfluoroethers are prepared according to U.S. Pat. No. 3,715,378, and subsequently neutralized with fluorine according to U.S. Pat. No. 3,665,041;

(A5) $[C_3F_7O(C_3F_6O)_m$—$CF(CF_3)$—$]_2$ where m is a positive integer.

These products are obtained by ionic telomerization of the hexafluoropropene epoxide and subsequent photochemical dimerization of the acid fluoride according to processes described in U.S. Pat. No. 3,214,478;

(A6)

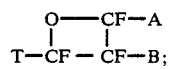 (1)

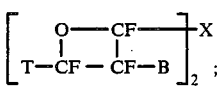 (2)

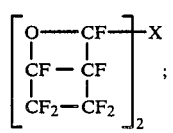 (3)

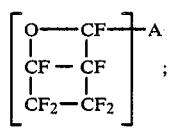 (4)

where A=F, a perfluoroalkyl radical with from 1 to 8 carbon atoms, a group

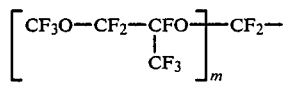

in which m is an integer from 0 to 5 (extremes included), a group

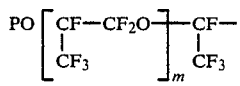

in which P is a perfluoroalkyl radical with 1 to 8 carbon atoms and m is the same as defined hereinabove; B and T, like or unlike eath other, may be: F, a perfluoroalkyl radical with 1 to 7 carbon atoms, a group

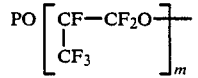

in which m and P are the same as defined hereinbefore, X is equal to $-CF_2O-(CF_2O)_p-(C_2F_4O)_q-C_2-$, in which p and q, like or unlike each other, are integers from 0 to 5 (extremes included, and where the sum p+q is at least equal to 1, or a group $-(CF_2)_r-$, in which r is an integer from 1 to 8; and characterized in that at least one of groups A, B, T in class (1), or B, T, X in class (2), contains one or more ethereal real oxygen atoms, and in classes (3) and (4) the groups X and A are selected from the abovesaid radicals containing ethereal oxygen atoms; and furthermore characterized in that, when one of radicals B or T is equal to the group

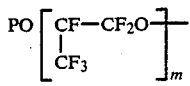

the other radical is equal to F.

Said perfluoroethers are prepared by cycloaddition reactions between a fluoride of a perfluorinated acid and a perfluoroolefin in which at least one of the compounds contains an ethereal oxygen atom, according to what is described in an earlier patent application filed by the Applicant hereof;

(A7) $R_fO(CD_2CF_2CF_2O)_nR_f'$, where $R_f$ and $R_f'$, equal or different from each other, are fluorinated alkyl radicals, D is H or F and n is a positive integer.

Said perfluoropolyethers are prepared according to European Patent Application No. 148,482;

(A8) $R_fO(CF_2CF_2O)_mR_f'$ where $R_f$ and $R_f'$, equal or different from each other, are $-CF_3$, $-C_2F_5$ and m is a positive integer.

Said perfluoropolyethers are prepared according to U.S. Pat. No. 4,523,039.

Besides the neutral perfluoropolyethers it is possible also to utilize perfluoropolyethers having functional groups at one or at both ends.

Compounds (I) and (II), indicated hereinafter, respectively fall within the above-specified classes (A1) and (A3).

(I) $RO-(C_3F_6O)_m(CFXO)_n-CFX-L$, or
(II) $R''CFXO-(C_3F_6O)_x(CFXO)_y-(C_2F_4O)_z-CFX-L$, where
$R=-CF_3, -C_2F_5, -C_3F_7$
$X=-F, -CF_3$
$R''=-F, -CF_3, -C_2F_5$
m=an integer other than zero,
n=an integer comprising zero, and when n is different from zero, m/n varies from 5 to 20 and R is preferably=$-CF_3$, if n=zero, R is preferably $-C_2F_5$ or $-C_3F_7$
x=an integer comprising zero
y, z=integers, and x+z/y ranges from 5 to 0.5, y being different from zero, on conditions that, when x=zero, z/y ranges from 1 to 0.5, while X is preferably $-F$, and $R''=L$;
L=group Y—Z, where:
Y=$-CH_2O-$, $-CH_2OCH_2-$, $-CF_2-$, $-CF_2O-$
Z=a non-aromatic, non-fluorinated organic radical, free from active hydrogen atoms, containing two or more like or different heteroatoms, donors of electron doublets, or an aromatic radical, either or not containing heteroatoms, capable of givin rise to coordinative bonds or to charge-transfer bonds, thus causing various kinds of absorption phenomena on metal, polymeric or ceramic material surfaces.

These perfluoropolyethers containing functionalities are prepared as is described in Italian patent applications Nos. 21480 A/84 and 21481 A/84 in the name of the applicant.

Also difunctional perfluoropolyethers like the ones described in U.S. Pat. No. 4,094,911 and U.S. Pat. No. 4,085,137 (Mitsch) can be usefully employed.

As compounds of class (A4) it is possible to use also perfluoropolyethers comprising, besides units $C_2F_4O$ and $CF_2O$, also units $(CF_2CF_2CF_2O)$ and $(CF_2CF_2CF_2CF_2O)$, as is described in the article "Perfluoropolyethers by Photooxidation of Fluoroolefins" by D. Sianesi, A. Pasetti, R. Fontanelli, G. C. Bernardi and G. Caporiccio—La Chimica e l'Industria February 1973, pages 216–220.

Besides the copolymers containing the above-indicated units, it is possible to utilize also homopolymers prevailingly or only, comprising the abovesaid units $(CF_2)_3O$ or $(CF_2)_4O$.

The neutral perfluoropolyethers of the indicated classes are preferably employed in the audio cassettes, which generally do not contain metallic accessory elements; in the video cassettes, the above-cited perfluoropolyethers containing functional groups are preferably utilized as they exhibit a higher adhesion to metals.

The deposition techniques utilizable for the liners of the audio cassettes are, for example, the coating by spraying or immersion or by rubbing with a soaked pad, starting from dilute solutions of perfluoropolyethereal oils in 1,1,2-trichlorotrifluoroethane, in the case of applications onto already punched plates, or the continuous coating, by means of spraying techniques, or the application by means of extrusion head or gravure roll coating of the plastic film tape to be punched.

In the video cassettes, the application of the lubricant to the sliding cylinders and to the tension tab can be accomplished preferably by immersion or rubbing.

The lubricant thicknesses utilizable in said application are in the range from 50 to 20000 Å, and preferably from 100 to 10000 Å.

The solution's concentrations useful to obtain the said thicknesses are in the range from 0.1 to 10% of perfluoropolyethereal oil in 1,1,2-trichlorotrifluoroethane, and preferably from 0.2 to 5% by weight.

The perfluoropolyethers according to the invention, when used as lubricants in the video cassettes, prove to be particularly efficaceous, as regards a reduction of friction, also during the fast-winding steps of the tape.

The following examples are given merely to illustrate the present invention, without being however a limitation thereof.

EXAMPLE 1

To check the friction properties of the various lubricating materials and to make a comparison with the technologies in use at present, a comparative measurement of the tape friction against the liner during the unwinding and the fast rewinding in the cassette was carried out.

There were tested small plates made of PET (polyethyleneterephthalate), in one case (Case A in Table I) in the absence of coating or lubricating layer, in another case (case B in Table I) in the presence of a graphitized coating limitatedly to two parallel bands in which the contact area with the reel side is the greatest; in a third case (case C in Table I) the plate was coated with perfluoropolyether, commercially known as Fomblin Y 06 ($\eta=60$ cSt at 20° C.).

The application method utilized to prepare the lubricated plates was the following: the plate was uniformly rubbed with a pad soaked with a solution at 10% by weight of perfluoropolyethereal oil dissolved in 1,1,2-trichlorofluoroethane.

The thickness of the resulting film was of the order of 5000 Å; the plate so lubricated was then introduced again into the cassette.

To carry out the test, an usual commercial recorder was utilized, the friction (during the FAST FORWARD or REWIND operations) having been evaluated by measuring the absorbed current. The data relating to the rewind operation are reported on Table I.

In consideration of the different diameter of the reels in the various steps of the rewind process, the current absorption at the beginning, at the half and at the end of the operation was measured, and the results obtained under the same conditions were compared with one another.

EXAMPLE 2

In order to test the behaviour of the interface between tape and lubricated plate, linear friction coefficient tests according to ASTM method 1984 73 (DIN 53375) were performed.

The apparatus utilized to the purpose consisted of a platform coated with one of the two materials forming the kinematic couple (in the present case, the material forming the liner).

The other component consisted of the tape reel horizontally resting on the liners.

The tangential stress was detected through a loading cell and was graphically recorded, after a proper signal conditioning, by a potentiometric recorder as a function of the time.

From the resulting graph there were calculated the friction coefficient values resulting from the ratio between tangential stress and normal stress.

For this example there were used PET liners lubricated with perfluoropolyethereal oils commercially known as Fomblin Z 25 ($\eta=250$ cSt at 20° C.).

The results obtained, to be considered in terms of static and dynamic friction coefficients, are reported in Table II.

EXAMPLE 3

To verify the validity of the technological choice based on the liner lubrication, a mechanical torque measurement of audio cassettes was effected by means of an apparatus "Information Terminals M400 Cassette tester". Such measurements are generally made by manufacturers of audio cassettes for the production quality control; the instrument substantially measures the current absorbed by the motor which keeps the tape rotating and permits the reading of the mechanical torque (in g*cm). The readings, according to the quality control practice, are made at the beginning and at the end of the tape rewinding.

Table III shows the experimental results obtained by using, as lubricants for the liners, perfluoropolyethereal oils commercially known as Fomblin Z 25 ($\eta=250$ cSt at 20° C.). From a comparison of the data it clearly comes out that an improvement in the mechanical performances of the audio cassettes occurs when the perfluoropolyether indicated by the invention is used.

From the obtained results it is possible to infer that the liners treated with perfluoropolyethereal oil—besides meeting, as regards the mechanical characteristics, the specifications determined time ago by Philips, generally a starting torque of 8 g*cm and a final torque of 20 g*cm—permit a more uniform sliding of the tape inside the valves as compared with the graphite-coated liners, either the ones made of PET or the ones made of PTFE.

EXAMPLE 4

The sliding steel cylinders and the tension tab of a commercial-type video cassette were lubricated. Lubrication was done by immersion of said parts, taken out from the cassette, into a solution at 1% of perfluoropolyether having functional groups at both ends, of class (II), in which $x=O$, $Y=CH_2OCH_2$, $R''=L$ and

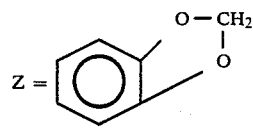

in 1,1,2-trichlorotrifluoroethane.

The lubricated parts were then placed again "in situ" and a mechanical test was carried out on the cassette so modified by using, as a comparison, an untreated cassette belonging to the same production lot.

The tractive force required to cause the tape to slide (measured by means of a dynamometer) was of 10 g in the lubricated cassette instead of 15–18 g as necessary for the comparison tape. The obtained values are the average of five tests.

On the same cassettes, electromagnetic tests were performed (still frame, counting of dropouts, chromanoise, luminance to noise ratio), which did not reveal any worsening of the tape properties as a consequence of lubrication.

In the proposed application, however, the lubricant was not in contact with the tape magnetic coating, but only with the top surface of the plastic substrate.

TABLE I

| Case | Current absorption (mA) rewind step | | |
|---|---|---|---|
| | Beginning | Half | End |
| A | 90 | 105 | 185 |
| B | 95 | 87 | 187 |
| C | 80 | 95 | 160 |

TABLE II

| Description | Friction coefficient | |
|---|---|---|
| | Static | Dynamic |
| Liner lubricated with Fomblin Z25 (series shaped) (**) | 0.20 | 0.12 |
| Graphitized liner (manually shaped) (*) | 0.33 | 0.29 |
| Graphitized liner (series shaped) (**) | 0.41 | 0.26 |
| PTFE liner filled with | 0.29 | 0.20 |

TABLE II-continued

| Description | Friction coefficient | |
|---|---|---|
| | Static | Dynamic |
| graphite | | 5 |

(*) Manually shaped: it means that the liner was manually adapted in order to reduce to the minimum the contact area between reel and liner.
(**) Series shaped: it means the utilization of commercial-type liners.

TABLE III

| Description | Starting torque g*cm | Final torque g*cm |
|---|---|---|
| Cassette with wide window - Graphite-filled PTFE liner | | |
| side 1 | 6 | 16 |
| side 2 | 6 | 14 |
| Cassette with wide window - Band-graphitized liner | | |
| side 1 | 8 | 12 |
| side 2 | 4 | 12 |
| Cassette with wide window - Liner lubricated with Fomblin Z25 | | |
| side 1 | 3.5 | 13 |
| side 2 | 3.5 | 8 |
| Cassette with narrow window - PET liner lubricated with Fomblin Z25 | | |
| side 1 | 2.5 | 8 |
| side 2 | 3.0 | 10 |
| Cassette with wide window - PET liner lubricated with Fomblin Z25 | | |
| side 1 | 3.5 | 9 |
| side 2 | 5.0 | 13 |

What is claimed is:

1. A process for protecting magnetic tapes from friction and wear caused by the metallic or nonmetallic accessory elements, which constitute the cassette, during their operation, characterized in that said accessory elements are lubricated with a perfluoropolyethereal fluid having a viscosity ranging from 10 to 1500 cSt at 20° C. and comprising compounds having units selected from the class consisting of:

(A1) (C₃F₆O) and (CFXO) statistically distributed along the perfluoropolyether chain, where X is equal to —F, —CF₃;

(A2) (C₃F₆O);

(A3) (C₃F₆O), (C₂F₄O), (CFXO), statistically distributed along the perfluoropolyether chain, where X is equal to —F, —CF₃;

(A4) (C₂F₄O), (CF₂O) statistically distributed along the perfluoropolyether chain;

(A5) (C₃F₆O), including furthermore the characteristic group —CF(CF₃)—CF(CF₃)—;

(A6) an oxetane ring of the formula selected from:

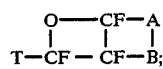

(1)

in which at least one of the groups linked to the ring contains an ethereal oxygen atom, and at least one of the groups does not contain ethereal oxygen atoms; or an oxetane ring of the formula selected from:

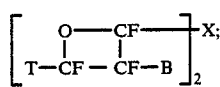

(2)

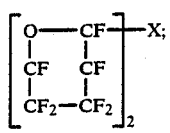

(3)

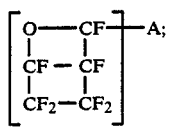

(4)

in which the group linked to the ring contains at least one ethereal oxygen atom; and where A=F, a perfluoroalkyl radical with 1 to 8 carbon atoms, a group

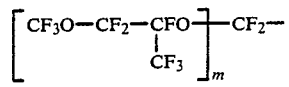

in which m is an integer from 0 to 5 (extremes included), a group

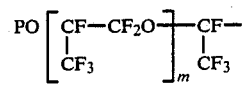

in which P is a perfluoroalkyl radical containing 1 to 8 carbon atoms and m is defined as hereinabove; B and T, like or unlike each other, may be: F, a perfluoroalkyl radical with 1 to 7 carbon atoms, a group

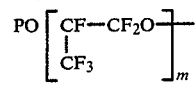

in which m and P are the same as defined hereinabove, X is equal to —CF₂O (CF₂O)ₚ (C₂F₄O)_q CF₂, in which p and q, like or unlike each other, are integers from 0 to 5 (extremes included), and where the sum p+q is at least equal to 1, or a group —(CF₂)ᵣ—, in which r is an integer from 1 to 8; and characterized in that at least one of groups A, B, T in class (1), or B, T, X in class (2) contains one or more ethereal oxygen atoms, and in classes (3) and (4) the groups X and A are selected from the abovesaid radicals containing ethereal oxygen atoms; and furthermore characterized in that when one of radicals B or T is equal to the group

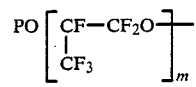

(A7) (CD₂CF₂CF₂O), where D is H or F; and
(A8) (CF₂CF₂O).

2. The process according to claim 1, characterized in that the utilized perfluoropolyether is selected from those belonging to the following perfluoropolyether classes:

(A1) RfO(C₃F₆O)ₘ(CFXO)ₙRf, in which: Rf=CF₃, C₂F₅, C₃F₇, X is equal to —F, —CF₃; m and n are integers, and the m/n ratio varies from 5 to 40 when n is different from O;

(A2) $C_3F_7O(C_3F_6O)_m$—$R_f$, where $R_f$ may be —$C_2F_5$, —$C_3F_7$, —CFHCF$_3$ and m is a positive integer;

(A3) $CF_3O(C_3F_6O)_m(C_2F_4O)_n(CFXO)_q$—$CF_3$, where X is equal to —F, —CF$_3$; m, n and q are integers, and n and q may be also 0; the m/n+q ratio ranges from 0 to 50, n/q ranges from 0 to 10, n+q and q being respectively different from 0;

(A4) $CF_3O(C_2F_4O)_p(CF_2O)_q$—$CF_3$, where p and q are integers like or different from each other, and they may be also 0, in which the p/q ratio ranges from 0.5 to 1.5;

(A5) $[C_3F_7(C_3F_6O)_mCF(CF_3)$—$]_2$, where m is a positive integer;

(A6)

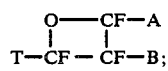
(1)

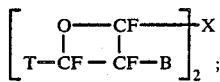
(2)

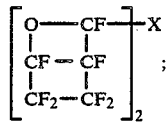
(3)

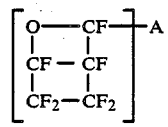
(4)

where A=F, a perfluoroalkyl radical with 1 to 8 carbon atoms, a group

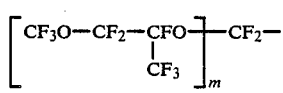

in which m is an integer from 0 to 5 (extremes included), a group

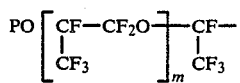

in which P is a perfluoroalkyl radical containing 1 to 8 carbon atoms and m is defined as hereinabove; B and T, like or unlike each other, may be: F, a perfluoroalkyl radical with 1 to 7 carbon atoms, a group

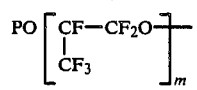

in which m and P are the same as defined hereinabove, X is equal to —$CF_2O$—$(CF_2O)_p$—$(C_2F_4O)_q$—$C_2$—, in which p and q, like or unlike each other, are integers from 0 to 50 (extremes includes), and where the sum p+q is at least equal to 1, or a group —$(CF_2)_r$—, in which r is an integer from 1 to 8; and characterized in that at least one of groups A, B, T in class (1), or B, T, X in class (2) contains one or more ethereal oxygen atoms, and in classes (3) and (4) the groups X and A are selected from the abovesaid radicals containing ethereal oxygen atoms; and furthermore characterized in that when one of radicals B or T is equal to the group

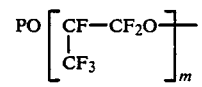

the other is equal to F;

(A7) $R_fO$ $(CD_2CF_2CF_2O)_n$ $R_f'$, where $R_f$ and $R_f'$, equal or different from each other, are fluorinated alkyl radicals, D is H or F and n is a positive integer;

(A8) $R_fO(CF_2CF_2O)_mR_f'$ where $R_f$ and $R_f'$, equal or different from each other, are —CF$_3$, —C$_2$F$_5$— and m is a positive integer.

3. The process according to claim 1, characterized in that there are utilized perfluoropolyethers represented by the following general formulas:

(I) RO—$(C_3F_6O)_m(CFXO)_n$—CFX—L, or
(II) R"CFXO—$(C_3F_6O)_x(CFXO)_y$—$(C_2F_4O)_z$—CFX—L, where:
R=—CF$_3$, —C$_2$F$_5$, —C$_3$F$_7$
X=—F, —CF$_3$
R"=—F, —CF$_3$, —C$_2$F$_5$
m=an integer other than zero
n=an integer comprising zero, and when n is different from zero, m/n varies from 5 to 20 and R is preferably=—CF$_3$, if n=zero, R is preferably —C$_2$F$_5$ or —C$_3$F$_7$
x=an integer comprising zero
y,z,=integers, and x+z/y ranges from 5 to 0.5, y being different from zero, on condition that, when x=zero, z/y ranges from 1 to 0.5, while X is preferably —F, and R"=L
L=a group Y—Z, where:
Y=—CH$_2$O—, —CH$_2$OCH$_2$—, —CF$_2$—, —CF$_2$O—
Z=a non-aromatic, non-fluorinated organic radical, free from active hydrogen atoms, containing two or more like or different hetero-atoms, donors of electron doublets, or an aromatic radical, either or not containing heteroatoms, capable of giving rise to coordination or charge-transfer bonds, thus causing various kinds of absorption phenomena on metallic, polymeric or ceramic material surfaces.

4. The process according to claim 2, characterized in that there are used perfluoropolyethers of class (A4) comprising, besides repeating units $C_2F_4O$ and $CF_2O$, also units $CF_2CF_2CF_2O$ and $CF_2CF_2CF_2CF_2O$.

5. The process according to claim 4, characterized in that there are used perfluorospolyethers prevailingly or only comprising unit $(CF_2)_3O$ or unit $(CF_2)_4O$.

* * * * *